US010621540B1

(12) United States Patent
Huddar et al.

(10) Patent No.: US 10,621,540 B1
(45) Date of Patent: Apr. 14, 2020

(54) DETECTING AND PREVENTING INACCURATE PACKAGE DELIVERY STATUSES

(71) Applicant: Amazon Technologies, Inc., Seattle, WA (US)

(72) Inventors: Vijay Huddar, Bangalore (IN); Akshay Vinod Kataria, Nashik (IN); Srujana Punuru, Hyderabad (IN); Siddharth Srivastava, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 373 days.

(21) Appl. No.: 15/483,105

(22) Filed: Apr. 10, 2017

(51) Int. Cl.
*G06Q 10/08* (2012.01)
*G06Q 10/06* (2012.01)
*G06Q 30/00* (2012.01)

(52) U.S. Cl.
CPC ....... *G06Q 10/0833* (2013.01); *G06Q 10/067* (2013.01); *G06Q 10/0838* (2013.01); *G06Q 30/018* (2013.01)

(58) Field of Classification Search
CPC .... G06Q 10/08; G06Q 50/30; G06Q 10/0833; G06Q 10/087; G06Q 10/083; G06Q 10/08355; G06Q 20/4016; G06Q 50/28; G06Q 10/063114; G06Q 10/06398; G06Q 10/0835
See application file for complete search history.

(56) References Cited

U.S. PATENT DOCUMENTS

| | | | | |
|---|---|---|---|---|
| 8,140,592 B2 * | 3/2012 | Scott | ...................... | G06Q 10/00 707/805 |
| 8,473,326 B1 * | 6/2013 | Griffith | .............. | G06Q 30/0203 705/7.32 |
| 8,650,101 B1 * | 2/2014 | Glustrom | ............. | G06Q 10/087 705/29 |
| 2002/0178074 A1 * | 11/2002 | Bloom | ................... | G06Q 10/08 705/26.81 |
| 2003/0046133 A1 * | 3/2003 | Morley | .............. | G06Q 10/0631 705/7.12 |
| 2006/0229895 A1 * | 10/2006 | Kodger, Jr. | .......... | G06Q 10/025 705/333 |
| 2011/0017817 A1 * | 1/2011 | Belt | ........................ | G06Q 10/08 235/375 |
| 2017/0039512 A1 * | 2/2017 | Jones | ................... | G06Q 10/087 |
| 2017/0085711 A1 * | 3/2017 | Thomson | ............ | H04M 3/5175 |

OTHER PUBLICATIONS

MakeUPSDeliver.org, "UPS Unveils New Technology to Spy on Drivers", published 2007 with Archive.org capture 2015 (Year: 2015).*

* cited by examiner

*Primary Examiner* — Kevin H Flynn
*Assistant Examiner* — Michelle E Carey
(74) *Attorney, Agent, or Firm* — Eversheds Sutherland (US) LLP

(57) ABSTRACT

Systems, methods, and computer-readable media are disclosed for detecting and preventing inaccurate package delivery statuses. In one embodiment, an example method may include receiving, from a user device, an indication that a package for a recipient was not delivered to a delivery address, determining a user identifier for a user of the user device, determining a location of the user device, determining, using the user identifier and the location, that a likelihood the indication is a false indication satisfies a false indication threshold, and initiating a response action.

19 Claims, 8 Drawing Sheets

DETECTING AND PREVENTING INACCURATE PACKAGE DELIVERY STATUSES

BACKGROUND

Packages may be designated for delivery to certain users or addresses. Certain packages may be electronically tracked or otherwise identified, such that a status of the package can be determined. For example, a package may have a package status of in transit or delivered. Delivery agents may be responsible for a portion of the delivery process, such as delivering a package to a specific location or address. In some instances, delivery agents may provide or update package statuses, for example, from in transit to delivered. However, package statuses may sometimes be inaccurate. For example, a delivery agent may inaccurately indicate that a package was undeliverable. Such occurrences may negatively impact a user experience and may disrupt delivery of a package, as well as cause shipment delays.

Figure 1:
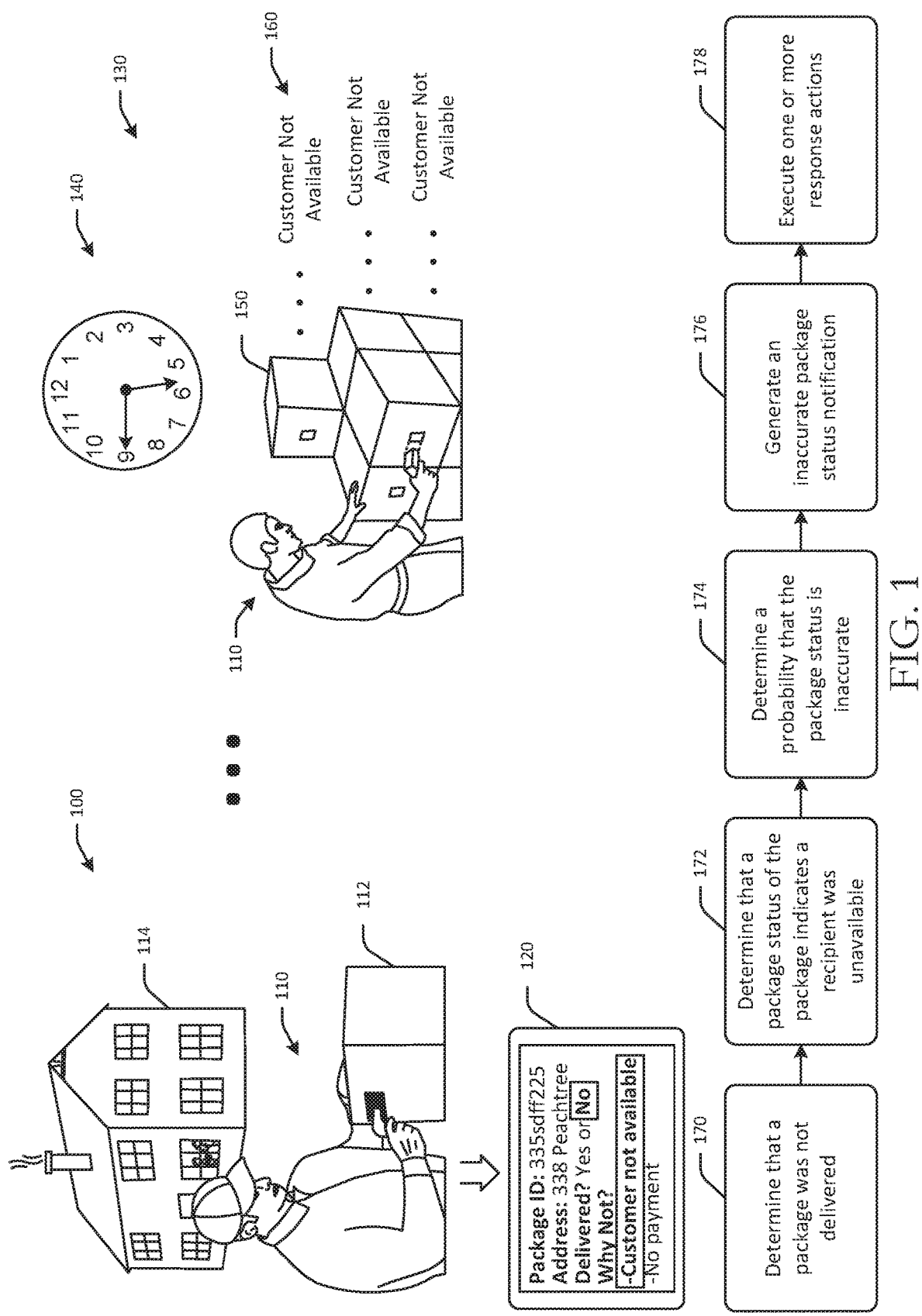
FIG. 1 is a hybrid system and process diagram illustrating detecting and preventing inaccurate package delivery statuses in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Packages may be associated with one or more package identifiers that can be used to identify or otherwise determine a package status of the package. For example, package identifiers such as barcodes, Quick Response codes, or other identifiers may be printed on labels that are affixed to packages. Some packages may be identified using electronic devices such as Radio Frequency Identification (RFID) devices, electronic transmitters or beacons, smart tags or electronic tags with embedded computer components, and other devices that may be used to uniquely identify one or more packages.

Package statuses may indicate a status of a particular package with respect to a stage of delivery for the package. For example, a package status may indicate that a package is at a particular warehouse facility or delivery station, that the package is in transit, that a delivery attempt has been made for the package, that the package has been delivered, and other package statuses. To input, update, or change a package status of a package, a delivery agent or other user may identify the package using a package identifier of the package. For example, a label on the package may be scanned or an RFID tag of the package may be read using a user device. The delivery agent or user may then input a package status or an update that may change the package status associated with the package. In some instances, the package status may automatically be updated or changed without user interaction or input. For example, an RFID tag reader or a camera at the entrance of a trailer or truck may detect package identifiers of packages that are loaded into the truck, and may automatically update the respective package statuses of those packages to indicate that the packages are in transit in that particular trailer or truck.

Last mile delivery, or delivery of a package to its final destination, which may be to a particular user or address, may be completed by a delivery agent or a user that is responsible for delivery of the package to its final destination. For example, delivery agents may take packages from a delivery station to an address that is the final destination of the package.

Delivery agents may use mobile devices to identify packages and/or update or change package statuses. For example, if a delivery agent attempts to deliver a package that is designated "signature required," and a recipient of the package or another person is not at the delivery location to sign for the package, the delivery agent may change the package status for the package to indicate that a delivery attempt was made, and that the customer was not available or was unavailable. The delivery agent may update or change the package status using a mobile device, such as a smartphone, a tablet, glasses, a watch, or another mobile electronic device.

At times, a delivery agent and/or a delivery station may be responsible for delivery of different volumes or numbers of packages. For example, during a holiday season, such as Christmas, Diwali, or Eid holiday seasons, a number or a volume of packages for delivery may increase, as people may send gifts to one another or for other reasons. During such times, delivery agents may be responsible for delivery or a higher number of packages than usual. An increase in packages may lead to delivery agents indicating that packages were undeliverable due to a customer being unavailable or for another reason, when, in fact, a delivery attempt was not made. This may be because the delivery agent has run out of time in a shift, or is otherwise unable to deliver all of the packages for which the delivery agent is responsible during a particular day. In such instances, a customer experience may be negatively affected by the customer or recipient of a package may have been expecting delivery of the package on a particular day (e.g., the estimated or guaranteed delivery date, etc.), and may disappointed when the package is not delivered. Moreover, the customer or recipient may actually have been home or otherwise available, but was not given the opportunity to receive the package because the delivery agent did not complete an attempt to deliver the package.

Embodiments of the disclosure may detect inaccurate package delivery statuses, and may prevent inaccurate package statuses from being entered by delivery agents or from being otherwise confirmed. For example, certain embodiments may use one or more machine learning models to determine whether a package status input from a delivery agent, such as a customer unavailable or a customer not available package status, is an accurate package status or an inaccurate package status. Such determinations may be in or near real-time, so as to prevent entry of, or confirmation of, inaccurate package statuses, thereby preventing or reducing a likelihood of a negative customer experience and incorrect or inaccurate package statuses. Certain embodiments may determine a likelihood that a package status entry or update from a delivery agent at a user device is inaccurate using a number of factors, such as contextual factors, package characteristics, user device or delivery agent location, historical performance data, and/or other factors. If a package status entry or update is likely to be inaccurate, or satisfies a threshold indicating that the package status entry or update is inaccurate, one or more response actions may be implemented. For example, user device settings at the user device of the delivery agent may be adjusted or modified (e.g., the delivery agent may be prevented from selecting certain options, such as a "customer unavailable" option, etc.), notifications sent to a recipient account for a recipient of the package may be sent and/or modified (e.g., a "shipment delayed" notification may be sent instead of a "customer unavailable" notification, etc.), notifications may be sent to a delivery station associated with the delivery agent, and/or other response actions.

This disclosure relates to, among other things, devices, systems, methods, computer-readable media, techniques, and methodologies for detecting and preventing inaccurate package delivery statuses. Package status updates or entries may be determined to be inaccurate in real-time or in near real-time using one or more machine learning models or algorithms. If a package status update or entry, for example, from a delivery agent device is determined to be inaccurate, one or more response actions can be implemented, such as triggering one or more notifications to a user account of a recipient of the package and/or to a delivery station account of a delivery station associated with the delivery agent.

Referring to FIG. 1, an example use case 100 illustrating detecting and preventing inaccurate package delivery statuses is depicted in accordance with one or more embodiments of the disclosure. A delivery agent 110 may be responsible for delivering a package 112 to a destination, such as its final destination, which may be a delivery address. A house or residence 114 may be at the delivery address. A recipient of the package or another customer may be at the residence 114. However, the delivery agent 110 may indicate that the customer was not available, and that therefore the package 112 could not be delivered, even though the customer was available. For example, the delivery agent 110 may scan a package identifier of the package 112 using a user device 120. The package identifier may be a printed label, an electronic device configured to wirelessly communicate with the user device 120, or another package identifier. The user device 120 may be a mobile electronic device, such as a smartphone, a tablet, a smart watch, a package scanning device, a laser device, a handheld device (e.g., a handheld package scanning device, etc.), or another device.

After the package identifier of the package 112 is scanned or detected, the package 112 may be identified and package data associated with the package may be presented at a display of the user device 120. For example, as shown in FIG. 1, a package identifier may be presented at the user device 120, along with a delivery address associated with the package 112. The user interface presented at the user device 120 may prompt the delivery agent 110 to input whether or not the package was delivered and/or whether a delivery attempt was made. For example, the user interface may include a prompt of "delivered?" with selectable inputs of "yes" or "no." The delivery agent 110 may input a response or select a selectable option. For example, the delivery agent 110 may select the "no" option.

After the "no" option is selected by the delivery agent 110, the user interface presented at the user device 120 may prompt the delivery agent 110 for a reason why the package was not delivered. In response to the prompt, the delivery agent 110 may input a response, which may be a selection of one or more selectable options. For example, the user interface may include selectable response options of "customer not available," "no payment" (indicating that the customer did not pay for a cash on delivery package, etc.), or other options.

The delivery agent 110 may select the "customer not available" option in response to the prompt regarding why the package was not delivered. If certain options are selected, or certain inputs are input, by the delivery agent 110, a determination may be made as to whether the input or selected option is inaccurate. In some embodiments, a determination may be made as to whether the input or selected option is inaccurate regardless of the selected option or other input. For example, the delivery agent 110 may select the "customer not available" option in the example of FIG. 1. One or more remote servers in wired or wireless communication with the user device 110 may receive, from the user device 120, an indication that the delivery agent 110 selected the customer unavailable option in response to a delivery status prompt for the package 112. The customer unavailable option may indicate that a recipient of the package 112 was not available at a delivery address for the package 112. As a result, the delivery agent 110 may attempt to change or update the package status for the package 112 to an unsuccessful delivery attempt, or a delivery failure due to the customer being unavailable, even though the recipient or customer was present at the residence 114.

The delivery agent 110 may also mark or otherwise indicate that other packages were not delivered due to the respective customers being unavailable. For example, at a second instance 130, the delivery agent 110 may be nearing an end of the delivery agent's shift 140, which may be 6:00 pm or another time. As the delivery agent's shift nears an end, the delivery agent 110 may have a number of undelivered packages 150. Rather than delivering the undelivered packages 150, the delivery agent 110 may scan or detect the respective package identifiers for the undelivered packages 150 and may indicate that the respective recipients or customers were not available, and that therefore delivery of the packages 150 was unsuccessful. The delivery agent 110 may therefore attempt to update or change package statuses for the undelivered packages 150 to "customer not available" package statuses 160. This may occur even if the delivery agent 110 did not make an attempt to deliver the packages 150. Such actions may degrade the customer experience, as recipients or customers may be expecting delivery of the undelivered packages 150. However, in a rush to end the delivery agent's shift, the delivery agent 110 may identify the packages as undelivered due to the customer being unavailable.

An example process flow for detecting and preventing inaccurate package delivery statuses, such as those described in FIG. 1, may include determining that a package was not delivered at a first operation 170. For example, an indication of a package not being delivered may be received from a delivery agent user device by one or more remote servers. At a second operation 172, the one or more remote servers may determine that a package status of the package indicates that a recipient of the package was unavailable. For example, the delivery agent may indicate, using the user device, that a package was not delivered because the customer or recipient was not available. At a third operation 174, the one or more remote servers may determine a probability that the package status is inaccurate. For example, the one or more remote servers may use contextual data (e.g., a time of day or a time at which the package status update was received, a location of the delivery agent and/or user device with respect to the delivery address of the package, etc.), delivery agent historical data, package characteristics (e.g., a level of priority associated with the package, size and weight of the package, etc.), a number of previous delivery attempts for the package, delivery address historical data (e.g., how many times in the past has a recipient been unavailable at the delivery address for other deliveries, etc.), a number of package status updates received from the user device and/or delivery agent within a predetermined time interval (e.g., has the delivery agent marked 15 packages in succession as undelivered due to customer being unavailable? etc.), delivery agent tenure, a day of the week, and/or other factors to determine a probability that the package status is inaccurate. Probability scores may be numerical values (e.g., between 0 and 1, between 0 and 100, etc.). At a fourth operation 176, the one or more remote servers may generate an inaccurate package status notification. For example, the one or more remote servers may determine that the probability that the package status is inaccurate meets or exceeds a certain threshold, and that the package status is therefore inaccurate. The one or more remote servers may generate an inaccurate package status notification that is sent to the user device 120, a supervisor's user account for the delivery agent's supervisor, a delivery station account for a delivery station associated with the delivery agent and/or another user account. At a fifth operation 178, one or more response actions may be executed. For example, the one or more remote servers may send the inaccurate package status notification to one or more user accounts. Other response actions may include preventing the delivery agent from selecting the "customer not available" option at the user device 120 by causing the user device 120 to prevent selection of the option, sending a delayed shipment notification to a user account of the recipient of the package (which may be sent instead of another notification), modifying performance statistics of the delivery agent 110 and/or the delivery station associated with the delivery agent 110, and other response actions.

The systems, methods, computer-readable media, techniques, and methodologies for detecting and preventing inaccurate package delivery statuses may result in accurate package statuses being entered, stored, and/or propagated across databases or computer systems, and may improve a customer experience by preventing misuse and/or entry or confirmation of inaccurate package statuses. Delivery agent performance may be quantified and may reflect delivery agent performance with respect to inaccurate package status entries or attempts. Delivery station scores may be generated using delivery agent scores of delivery agents associated with the particular delivery stations, which may be used to compare and/or rank delivery station performance. In some embodiments, machine learning and/or algorithms may be executed in real-time to determine a probability that a certain package status entry or update is inaccurate. Certain embodiments may implement or execute response actions after determining that a package status entry is inaccurate.

Example embodiments of the disclosure provide a number of technical features or technical effects. For example, in accordance with example embodiments of the disclosure, certain embodiments of the disclosure may generate probability values indicative of a likelihood that a package status entry or update is inaccurate. Certain embodiments may cause one or more response actions to be executed in response to determining that a package status entry or update is inaccurate, such as causing one or more operations to be executed at a user device and/or one or more notifications to be generated or replaced and sent to various user accounts. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
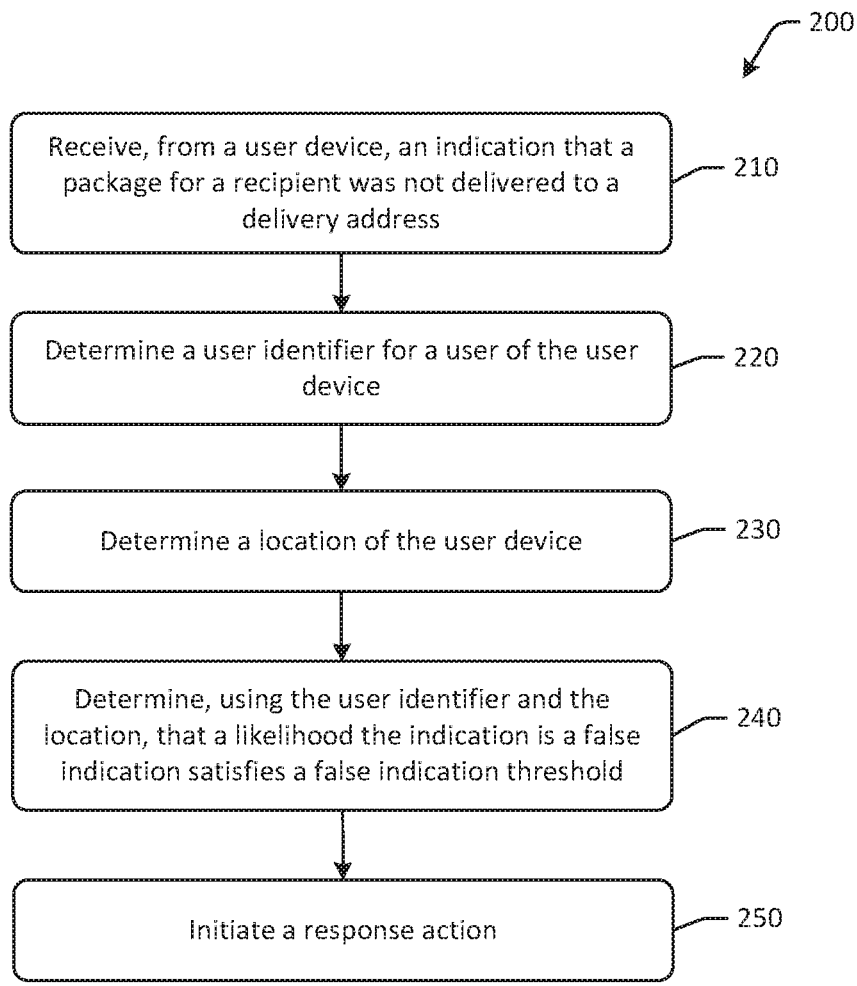
FIG. 2 is an example process flow diagram for detecting and preventing inaccurate package delivery statuses in accordance with one or more embodiments of the disclosure.

Referring to FIG. 2, an example process flow 200 for detecting and preventing inaccurate package delivery statuses in accordance with one or more embodiments of the disclosure is depicted. Although certain operations are illustrated as occurring separately in FIG. 2, some or all of the operations may occur concurrently or partially concurrently across one or more computer systems in any order. One or more operations may be optional in FIG. 2.

At block 210 of the process flow 200, an indication that a package for a recipient was not delivered to a delivery address may be received from a user device. For example, one or more remote servers may receive an indication from a user device associated with a delivery agent, or a user responsible for delivering a package to a delivery address, that the package was not delivered. The indication may be based at least in part on an input at the user device by the delivery agent, and may indicate that the package was not delivered. In some embodiments, the indication may be associated with a reason code indicative of a reason the package was not delivered. For example, reason codes may be associated with reasons of a customer or recipient being unavailable, a payment not being made, or other reasons. In one embodiment, computer-executable instructions of one or more package status determination module(s) stored at a server may be executed to receive an indication that a package for a recipient was not delivered to a delivery address.

At block 220 of the process flow 200, a user identifier for a user of the user device may be determined. For example, the user device may be linked to or associated with a delivery agent identifier that identifies a user of the user device at the time the indication was received and/or the package status update was input at the user device. The delivery agent identifier and/or the user identifier may therefore be determined using a user device identifier of the user device. In one embodiment, computer-executable instructions of one or more package status determination module(s) stored at a server may be executed to determine a user identifier for a user of the user device, which may be based at least in part on a user device identifier.

At block 230, a location of the user device may be determined. For example, a location of the user device at the time the indication was received and/or the package status update was input at the user device may be determined. Device location may be determined based at least in part on location data received from and/or requested from the user device. For example, the user device may be configured to send location data to one or more remote servers as metadata along with the indication. In some embodiments, the one or more remote servers may determine the location of the user device using triangulation and other location-based techniques. Location data may be associated with timestamps indicative of a time at which the device was at that particular location. In one embodiment, computer-executable instructions of one or more device location determination module(s) stored at a server may be executed to determine a location of the user device. The location may be at the time the indication was received or at the time the input was made at the user device. In some embodiments, the server may request location data from the user device, while in other embodiments, the user device may send location metadata to the server with the indication or other signal.

At block 240, it may be determined, using the user identifier and the location, that a likelihood that the indication is a false indication satisfies a false indication threshold. For example, the likelihood that the indication is a false indication may be represented as a probability score. The probability score may be compared against a false indication threshold to determine whether the probability score is equal to or greater than (or less than, in some embodiments) the false indication threshold. If the probability score or the numerical representation of the likelihood satisfies the false indication threshold, the indication may be determined to be a false indication. In one embodiment, computer-executable instructions of one or more false indication determination module(s) stored at a server may be executed to determine historical performance data for the delivery agent using the user identifier. The historical performance data may include historical false indication rates, peak false indication times and days for the delivery agent, performance trends, and other data specific to the delivery agent and/or the delivery station associated with the delivery agent. The computer-executable instructions of the one or more false indication determination module(s) stored at a server may be executed to determine a distance between the device location and the delivery address of the package for which the delivery agent is attempting to mark or update the package status as "customer not available" or otherwise undelivered. If the distance is below a certain threshold, indicating that the package status was updated by the delivery agent near the delivery address, the package status may be accurate, whereas if the distance is greater than the certain threshold, that may indicate the delivery agent did not even try to deliver the package, and the package status may be inaccurate. The distance threshold may be relative to the respective delivery address, and may be dynamic for different delivery addresses. For example, deliveries to a condominium building may have a different threshold than deliveries to an office park. Using at least some of the data determined based at least in part on the user identifier and/or the location, the computer-executable instructions of the one or more false indication determination module(s) stored at a server may be executed to determine the likelihood that the indication is a false indication. In some embodiments, one or more predictive models may be used to determine probability scores or likelihoods for specific indications and/or packages.

At block 250, a response action may be initiated. For example, computer-executable instructions of one or more response action module(s) stored at a server may be executed to initiate a response action after determining that the likelihood satisfies the false indication threshold. Response actions may include triggering one or more notifications or other communications to user accounts, causing actions to be performed at the user device, and other response actions.

Figure 3:
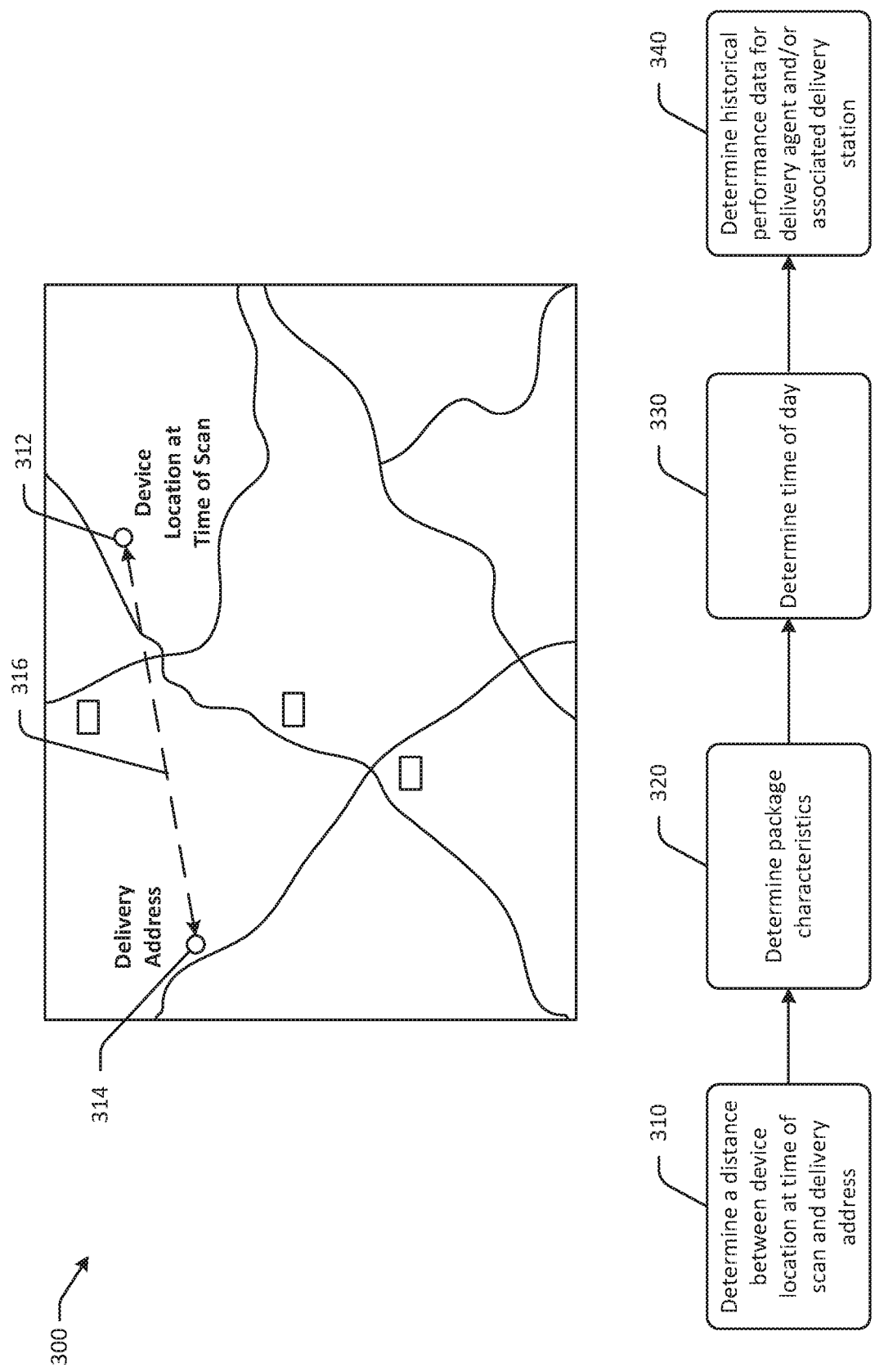
FIG. 3 is an example use case of determining contextual factors for a probability score in accordance with one or more embodiments of the disclosure.

FIG. 3 depicts an example use case 300 of determining contextual factors for a probability score in accordance with one or more embodiments of the disclosure. In particular, FIG. 3 illustrates an example process flow for detecting and preventing inaccurate package delivery statuses.

At a first operation 310, a distance between a device location at the time a package is scanned and a delivery address associated with the package is determined. A package scan may be a time at which a package identifier is scanned and/or a time at which a delivery agent indicates, at the user device, that the package was not delivered. For example, computer-executable instructions of one or more modules stored at a server may be executed to determine a device location 312 of a device at a time of scan, or at a timestamp corresponding to an input at the user device by a delivery agent. A delivery address location 314 may be determined based at least in part on information associated with the identified package. A distance 316 between the device location 312 and the delivery address location 314 may be determined. In one example, the distance 316 may be determined using geographic coordinates of the respective locations. In another example, the distance 316 may be determined using navigational routes between the respective locations (e.g., a driving distance instead of a shortest distance, etc.). The distance 316 may indicate whether or not the delivery agent was near the delivery address at the time of the scan or at the time the indication that the package was not delivered is received. In some embodiments, a location history for the user device for a predetermined length of time, such as the current day, may be used to determine whether the user device was near the delivery address at all during the day or during the delivery agent's shift, to account for instances where the delivery agent waits until the end of the shift to mark all truly undelivered packages (e.g., customer was really not available, etc.) as undelivered. The distance 316 may be used as a signal to determine whether the indication that the package was not delivered is accurate. For example, if the distance 316 is greater than a predetermined value, a probability score for the indication may be negatively impacted, because it may be likely that the delivery agent did not attempt delivery of the package. The predetermined value or threshold may be a maximum distance from the delivery address 314 that is allowed or allotted and may correspond to a distance at which it can reasonably be construed that the delivery agent attempted a delivery. The predetermined value or threshold may be different for different types of residences or addresses, such as for apartment buildings, houses, and office buildings.

At a second operation 320, package characteristics may be determined. For example, based at least in part on a package identifier of the package, computer-executable instructions of one or more modules stored at a server may be executed to determine package characteristics. Package characteristics may include package size, package weight, shipment costs, package value, shipping speed, shipping priority, and other characteristics. The package characteristics may be used to determine the probability score for the indication. For example, if the package is of relatively high value, the indication may be more likely to be accurate, as the delivery agent may realize that the recipient of the package may be awaiting its delivery. Similarly, if the package is large, the indication may be more likely to be accurate, as the delivery agent may not want to return to a delivery station with large packages. The delivery agent may also avoid inaccurate package statuses for packages that are shipped with relatively high shipping speeds or priority, as those packages may be more important to recipients and recipients may complain if those packages are not delivered.

At block 330, a time of day may be determined. For example, computer-executable instructions of one or more modules stored at a server may be executed to determine a time of day at which the indication is received. The time of day may be a timestamp, a portion of a day (e.g., evening, etc.), or another metric of time, and may be correlated to a delivery agent's shift or working hours. If the indication is received towards an end of the delivery agent's shift, the likelihood of an inaccurate package status may increase, as the delivery agent may not desire to finish delivery of packages. If the indication is received towards a beginning of the delivery agent's shift, the likelihood of an inaccurate package status may decrease.

At block 340, historical performance data for the delivery agent and/or a delivery station associated with a delivery agent identifier of the delivery agent may be determined. For example, computer-executable instructions of one or more modules stored at a server may be executed to determine a delivery station identifier that is associated with the user device identifier or the delivery agent identifier. The historical performance data may indicate the delivery agent's historic accuracy rate for accurate package statuses, a trending value for recent performance, a tenure or time of employment, and other data. Similar data may be aggregated across multiple delivery agents associated with a delivery station and used to determine historical performance of a delivery station. If the delivery agent is new or has little experience, the delivery agent may be more likely to indicate an inaccurate package status than a more experienced delivery agent.

Using some or all of this information, certain embodiments may determine a probability score indicative of a likelihood that the indication is an inaccurate representation of a delivery status for the package. For example, the distance 316, the time of day information, the package characteristics, and/or the historical performance data (for the delivery agent and/or the delivery station), may be used to generate a probability score that the indication is a false indication. The probability score may be compared to a false indication threshold to determine whether the indication is a false indication, and, if so, whether any response action is to be implemented.

Figure 4:
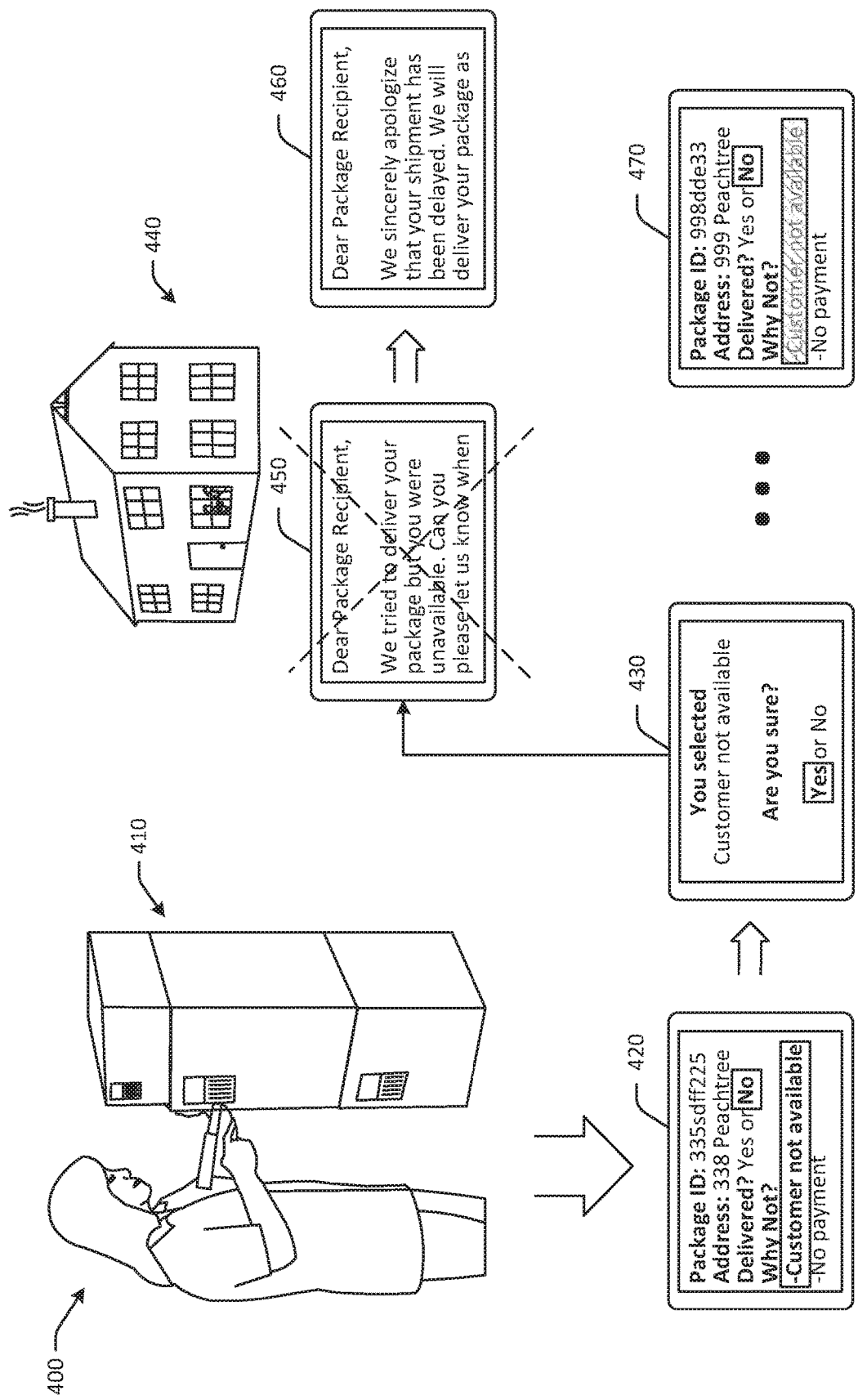
FIG. 4 is an example use case of initiating one or more response actions in accordance with one or more embodiments of the disclosure.

FIG. 4 depicts an example use case of initiating one or more response actions in accordance with one or more embodiments of the disclosure. In the example of FIG. 4, a delivery agent 400 may scan or otherwise determine a package identifier of a package 410 using a user device 420. The delivery agent 400 may indicate, using the user device 420, that the package 410 was not delivered because the customer or a recipient of the package was unavailable. The user device 420 may send a package status update indicating that the package was not delivered because the addressee or recipient was not available.

One or more remote servers may receive an indication of the package status update from the user device 420. Based at least in part on a user identifier of the delivery agent 400 and one or more contextual factors, the remote server(s) may determine a probability score indicative of a likelihood that the package status update is inaccurate. For example, the customer or recipient may have been available and/or no delivery attempt may have been made by the delivery agent 400. The remote server(s) may determine that the probability score satisfies an inaccurate status threshold. For example, the remote server(s) may determine that the probability score is equal to or greater than the inaccurate status threshold or false indication threshold, which may be represented as a numerical value.

If it is determined that the probability score satisfies the inaccurate status threshold and/or the false indication threshold, one or more response actions may be executed by the remote server(s) and/or the user device 420. For example, the remote server(s) may optionally cause a response action of a user interface 430 to be presented at the user device 420, where the user interface 430 prompts the delivery agent 400 to confirm the selection of "customer not available," so as to give the delivery agent 400 an opportunity to make a different selection in the event the delivery agent 400 made an incorrect or inaccurate selection or input. If the delivery agent 400 selects the "no" option at the user interface 430, the package status update may be canceled and the delivery agent 400 may scan or identify the package 410 again. If the delivery agent 400 confirms the "customer not available" selection at the user interface 430, the remote server(s) may determine whether the probability score has changed based at least in part on the confirmation at the user interface 430. If the probability score does not satisfy the inaccurate status threshold, the package status update may be determined to be accurate, and a response action of a customer unavailable notification 450 may be sent to a user account associated with a delivery address 440 or a user account of a recipient of the package. The customer unavailable notification 450 may indicate that a delivery attempt was made but was unsuccessful because the user or the recipient was not available. If the probability score satisfies the inaccurate status threshold, the remote server(s) may determine that the package status update is inaccurate, optionally in spite of the confirmation by the delivery agent 400 at the user interface 430, and may cause or initiate a response action of a shipment delayed notification 460 to be sent to the user account associated with the delivery address 440 or a user account of a recipient of the package. The shipment delayed notification 460 may be a different notification than the customer unavailable notification 450, and may indicate that there has been a delay in the shipment, and may avoid placing blame on the customer or recipient. The shipment delayed notification 460 may be sent instead of, or may replace, the customer unavailable notification 450 when the package status update is determined to be inaccurate or the probability score satisfies the inaccurate status threshold. In some embodiments, the customer unavailable notification 450 for sending to a recipient user account for the recipient of the package may be replaced with the shipment delayed notification 460. In some embodiments, the customer unavailable notification 450 may be suppressed or prevented from being sent to any user account in the event the package status update is inaccurate.

If the delivery agent 400 continuously indicates inaccurate package status updates, or if the delivery agent 400 has a certain number of inaccurate package status updates over a time interval, one or more response actions may be initiated to prevent the delivery agent 400 from continuing to input inaccurate package status updates. In one embodiment, the remote server(s) may determine that a total number of false indications from the user identifier is greater than an allotted number of false indications in a time period.

For example, if the delivery agent 400 has three or more inaccurate package status updates in a week (e.g., delivery agent indicates that customers were unavailable for three different packages that were actually inaccurate package status updates, etc.), the "customer not available" option may be suppressed at the user device 420. For example, as shown at user interface 470, the "customer not available" option may be grayed out, deleted, or otherwise suppressed for a length of time, so as to prevent the delivery agent 400 from selecting the "customer not available" option. The remote server(s) may cause the "customer not available" option to be prevented from selection, or prevented from presentation. Other response actions may be initiated or implemented by the user device 420 and the remote server(s). For example, discipline notifications may be triggered or sent if a delivery agent exceeds an allotted number of inaccurate package status updates. In another embodiment, a station identifier associated with a delivery agent identifier for the delivery agent may be determined, and an inaccurate status notification may be sent to a station identifier account or to a delivery agent's supervisor account, where the inaccurate status notification may include a package identifier for the package and the delivery agent identifier.

Figure 5:
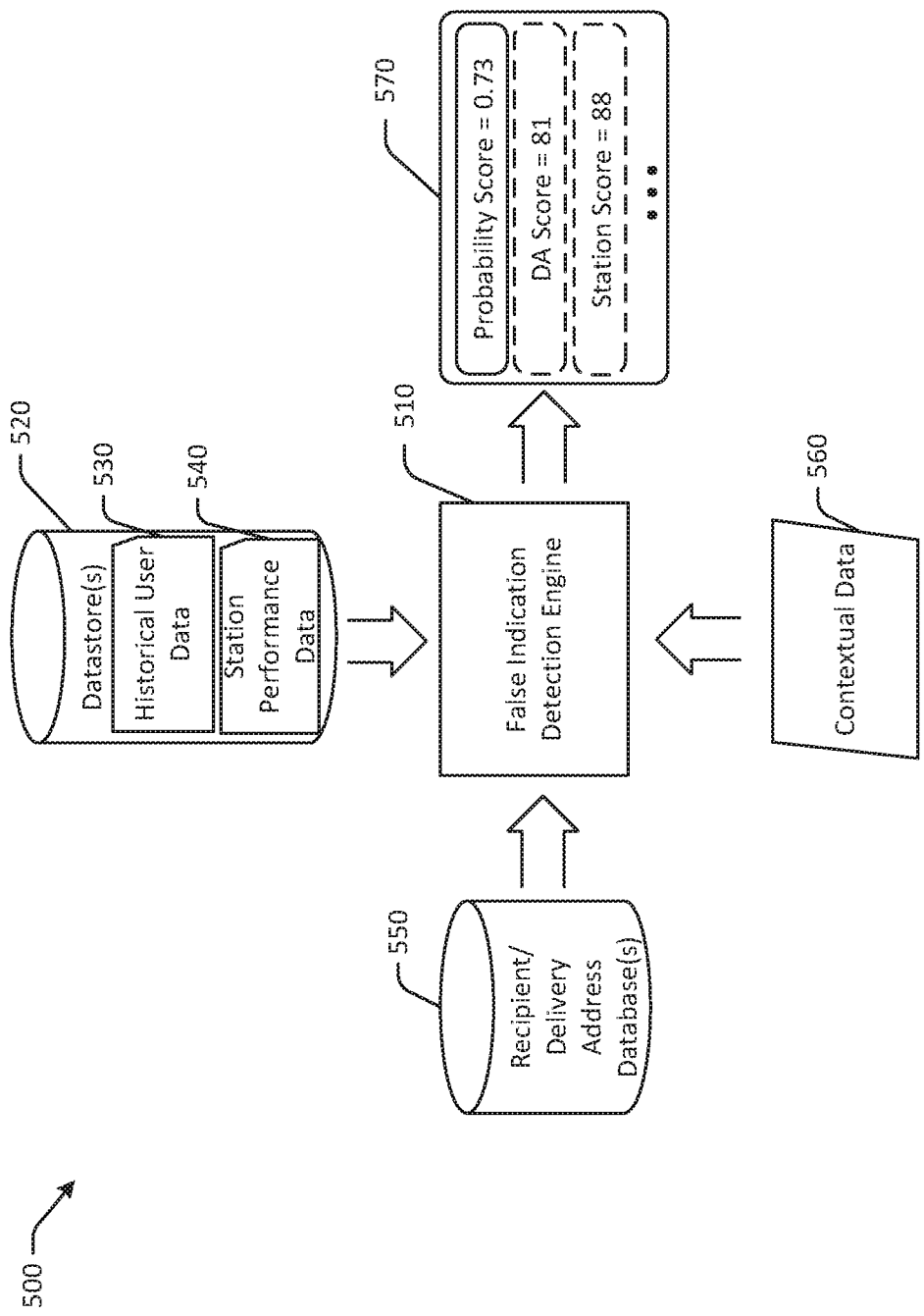
FIG. 5 is an example hybrid system and process flow diagram for determining false indications in accordance with one or more embodiments of the disclosure.

FIG. 5 is an example hybrid system and process flow diagram 500 for determining false indications in accordance with one or more embodiments of the disclosure. In FIG. 5, a false indication detection engine 510 may include computer-executable instructions to determine or detect false indications of package statuses or package status updates received from delivery agent devices. The false indication detection engine 510 may be stored at a user device or at one or more remote servers. The false indication detection engine 510 may be configured to determine and/or detect inaccurate package status indications. One or more inputs may be received by or sent to the false indication detection engine 510. For example, in FIG. 5, the false indication detection engine 510 may be in communication with a datastore(s) 520. The datastore(s) 520 may include historical user data 530 and station performance data 540. The false indication detection engine 510 may determine historical delivery agent data for a particular delivery agent using the datastore(s) 520. For example, a delivery agent's past performance metrics, such as on-time delivery percentage, first time delivery success rate, inaccurate package status update rate or count, and other metrics may be determined for the delivery agent. Other information, such as tenure or experience, delivery station associations, and the like may be determined by the false indication detection engine 510. For example, the false indication detection engine 510 may determine historical delivery performance data for the delivery agent using the delivery agent identifier. The false indication detection engine 510 may determine, using a user identifier for a delivery agent, a historical false indication rate for the user or delivery agent, where the false indication rate is a rate at which, or a number of times, the delivery agent indicates false or inaccurate package status updates.

The false indication detection engine 510 may determine historical delivery station performance data for a particular delivery station using the datastore(s) 520. Delivery station performance data may include one or more metrics that are aggregated across some or all delivery agents associated with the particular delivery station. The false indication detection engine 510 may determine a delivery station identifier based at least in part on a user identifier for a delivery agent, or based on other data, and may determine historical performance data of the delivery station identifier using the datastore(s) 520. In some instances, the false indication detection engine 510 may determine a station performance metric, such as a first time delivery success rate or a current delivery station load (e.g., is the delivery station busier than usual? etc.), for the station identifier using individual delivery agent scores for delivery agents associated with the delivery station identifier.

The false indication detection engine 510 may be in communication with a recipient/delivery address database(s) 550. The recipient/delivery address database(s) 550 may include information related to previous deliveries to a particular recipient or customer, or to a particular delivery address. If deliveries to a particular address have historically been difficult, or the recipient has generally been unavailable, then the false indication detection engine 510 may determine that a present package status update indicating the customer is not available may be more likely to be accurate, since the customer has been difficult to reach in the past. Other information at the recipient/delivery address database(s) 550 may include pin code information related to a geographic region of the delivery address (e.g., south, north, east, west, missing, etc.). The false indication detection engine 510 may access the recipient/delivery address database(s) 550 to determine a likelihood that a present package status update is inaccurate based at least in part on previous deliveries addressed to the recipient or to the delivery address.

The false indication detection engine 510 may be in communication with contextual data 560. The contextual data 560 may be stored or cached locally or remotely. The contextual data 560 may include one or more determinations and/or data related to a delivery context of a package, and other information. The contextual data 560 may include data for one or more specific package identifiers and/or user device identifiers. Contextual information may include user or delivery agent device location information and history; temporal features, such as timestamps, time of day information, day of week information, the hour of the day on which a scan is marked or an indication is provided; weather information at the time an indication is provided at the delivery agent device; a current station load compared to a normal station load; a number of employees or delivery agents associated with a delivery station identifier; package information, such as shipping speed, package value, package weight, package size, whether the package is designated for a commercial or residential destination, whether the package is a cash on delivery package, how many times delivery has been attempted for the package; delivery agent-specific information, such as the vehicle used by the delivery agent (e.g., bike, van, truck, etc.), tenure, etc. The false indication detection engine 510 may access the contextual data 560 to determine contextual factors for use in calculating probability scores.

For example, delivery agents may be more likely to indicate false or inaccurate package status updates for commercial addresses over weekends, because the delivery agents may assume the commercial locations may be unattended during weekends. Delivery agents may figure that residential addresses may be more likely to have people home, and so may avoid inaccurate package statuses for residential addressed packages over weekends.

Another contextual factor may include a time of delivery. Delivery agents may have a number of undelivered packages at or near an end of the delivery agent's shift, and may therefore be more likely to indicate inaccurate package statuses at times corresponding to an end of the delivery agent's shift. Similarly, package status updates or indications received at early morning times may also be more likely to be inaccurate. Accordingly, response actions can include blocking automated notifications or messages sent to recipient user accounts for late night or early morning package status indications, as such package status updates may be inaccurate. Manual review and/or approval of such indications may be performed before the customer is notified. Such factors may be considered or used in determining a probability score for a particular package status update.

Another contextual factor may include delivery agent load or a number of packages assigned to the delivery agent for delivery and/or delivery station load. In addition to, or instead of, loads, a change in load may be determined. A high load or a sudden increase in load, to either the delivery agent or the delivery station, may increase a likelihood of a false or inaccurate package status from a particular delivery agent or delivery station. Such factors may be considered or used in determining a probability score for a particular package status update.

Another factor that may be considered in determining a probability score may be a distance or an amount of elapsed time between consecutive scans or inputs by a delivery agent. For example, a physical distance between a current scan or indication from a delivery agent and an immediately previous or other prior scan may be determined. If the delivery agent has not moved or has barely moved between scans, it may be unlikely that a delivery attempt for the subsequent package was made, and the indication may be more likely to be inaccurate. In one embodiment, a previous location of a user device at a time a previous indication was received from the user device may be determined, and the previous location may be used to determine a distance between the device location and the previous location. The distance may be compared to a threshold or may be used in conjunction with delivery addresses of the respective packages in determining the probability score for one or both of the indications.

Using some or all of the information determined and/or received from the datastore(s) 520, the recipient/delivery address database(s) 550, and/or the contextual data 560, the false indication detection engine 510 may generate one or more outputs 570. For example, the false indication detection engine 510 may generate a probability score indicative of a likelihood that a package status update is inaccurate. In the example of FIG. 5, the probability score may be determined to be 0.73 on a scale of 0 to 1, which may represent a 73% chance that the package status is inaccurate. Additional outputs may optionally include an optional delivery agent score, which may be a numerical value, and a delivery station score, which may also be a numerical value and may be determined using one or more predictive models that may be the same used for determining the probability score. The false indication detection engine 510 may implement one or more machine learning algorithms to generate probability scores that may be used to detect inaccurate package statuses.

Figure 6:
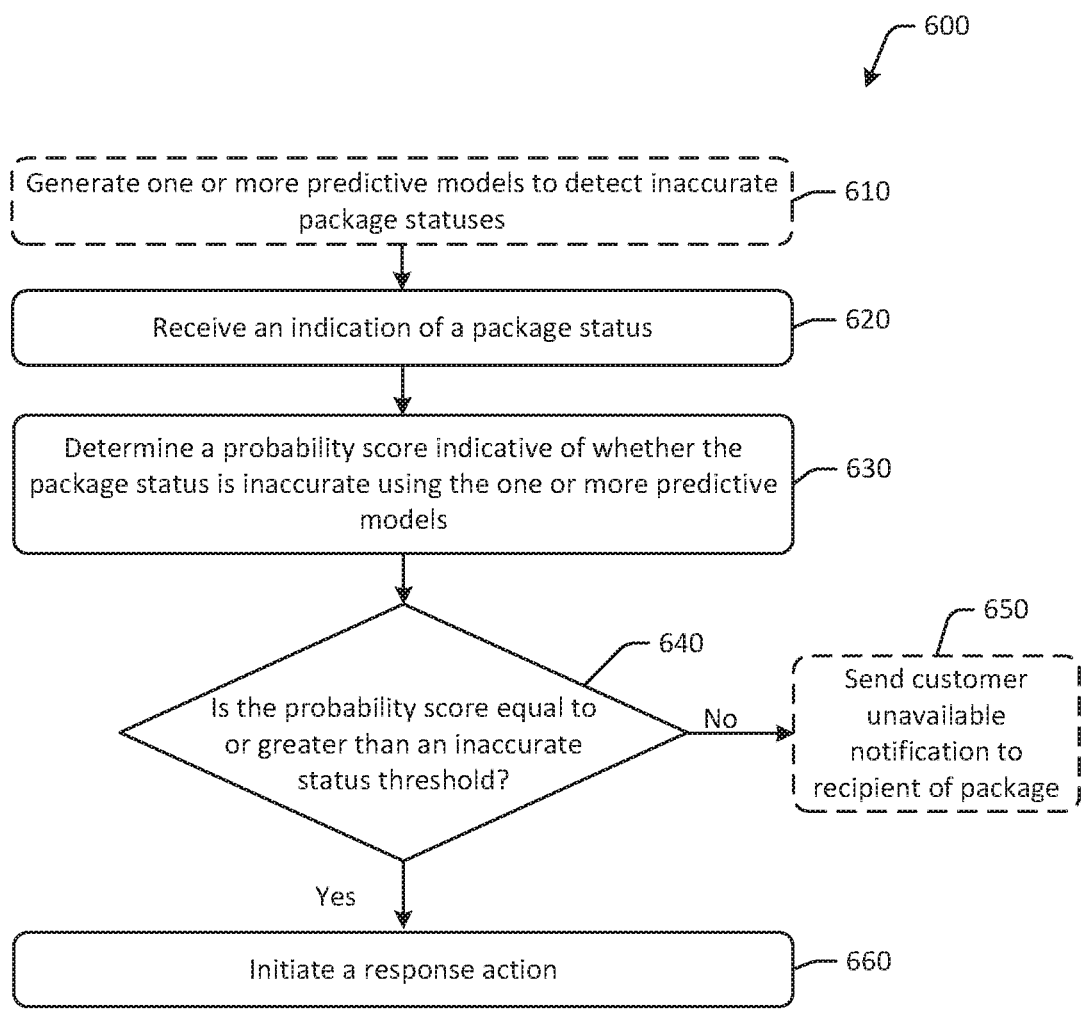
FIG. 6 is an example process flow diagram for determining whether a package status is an inaccurate package status in one or more values in accordance with one or more embodiments of the disclosure.

FIG. 6 depicts an example process flow 600 for determining whether a package status is an inaccurate package status in one or more values in accordance with one or more embodiments of the disclosure. The process flow 600 may be used, in some embodiments, by one or more servers to determine that a package status is inaccurate and/or to initiate one or more response actions.

At optional block 610, one or more predictive models to detect inaccurate package statuses may be generated. The predictive models may be generated using machine learning algorithms and may be trained using historical data related to delivery agents, delivered packages, undelivered packages, delivery stations, customer information, location information, contextual information, and other data.

At block 620, an indication of a package status may be received. For example, a delivery agent may scan or detect a package identifier with a user device, and may indicate a package status of the package by inputting or selecting a package status at the user device.

At block 630, a probability score indicative of whether the package status is inaccurate may be determined using the one or more predictive models. For example, inputs to the predictive model may include contextual information, historical information, package identifier, delivery agent and/or delivery station identifier, and other inputs. The probability score may be determined in real-time or in near real-time.

At determination block 640, a determination may be made as to whether the probability score is equal to or greater than, or otherwise satisfies, an inaccurate status threshold. For example, the probability score may be a numerical value that is compared to the inaccurate status threshold.

If it is determined at determination block 640 that the probability score does not satisfy the inaccurate status threshold, or is less than the inaccurate status threshold, the package status may be determined to be accurate, and the process flow 600 may proceed to optional block 650, at which a customer unavailable notification may be sent to a user account of a recipient of the package.

If it is determined at determination block 640 that the probability score does satisfy the inaccurate status threshold, or is equal to or greater than the inaccurate status threshold, the package status may be determined to be inaccurate, and the process flow 600 may proceed to block 660, at which a response action may be initiated. Response actions may include requesting confirmation from the delivery agent that the status is correct, sending or replacing one or more notifications, alerting a delivery station or supervisor, preventing the delivery agent from making certain selections at the user device in the future, preventing presentation of certain options at the user device, and other response actions.

Figure 7:
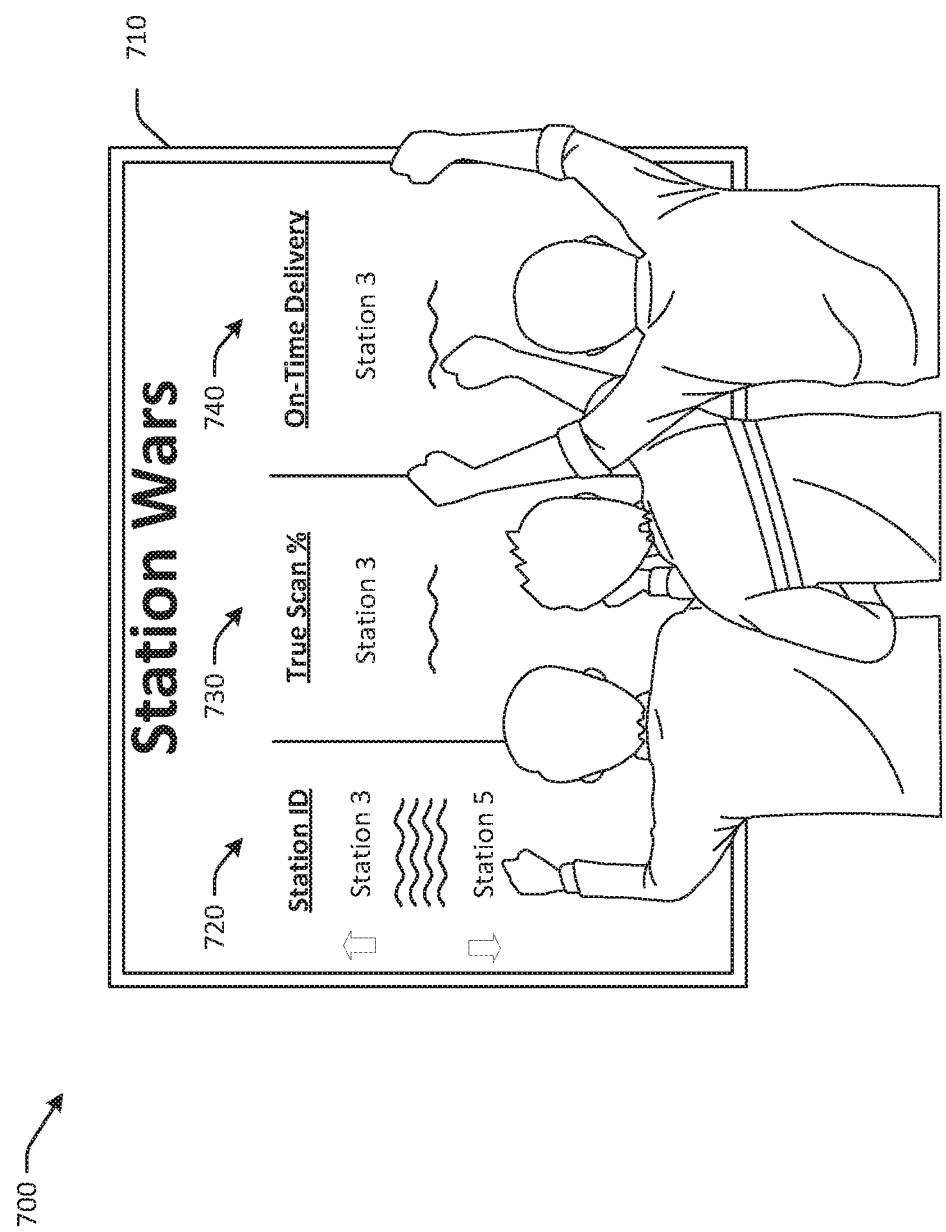
FIG. 7 is an example use case of a station ranking scoreboard in accordance with one or more embodiments of the disclosure.

FIG. 7 is an example use case of a station ranking scoreboard 700 in accordance with one or more embodiments of the disclosure. In some embodiments, delivery stations may be scored and ranked against each other, and may compete for rankings. For example, delivery station scores may be generated based at least in part on performance of delivery agents that are associated with the delivery station. As the performance of delivery agents improves, the delivery station score may improve. In some embodiments, the same algorithm used to generate delivery agent score may be used to generate delivery station scores. Delivery station scores may be determined in real-time and/or periodically updated and may be presented at the station ranking scoreboard 700.

The delivery station score may be determined based at least in part on volume of packages handled by the delivery station, an on-time delivery percentage, a true scan percentage or a number of accurate package statuses, and other metrics. The delivery station scores may be used to motivate delivery agents to improve performance.

In the example of FIG. 7, one or more station performance metrics for a delivery station identifier may be determined using one or more delivery agent scores for delivery agents associated with the delivery station identifier. For example, the delivery station identifiers may be determined and presented in a first column 720, and a performance metric of true scan percentage may be determined for the respective delivery station identifiers and presented in a second column 730 at the scoreboard 700. A performance metric of on-time delivery may be determined for the respective delivery station identifiers and may be presented in a third column 740 at the scoreboard 700.

In one embodiment, to determine station scores, a set of user identifiers associated with a delivery station identifier may be determined, and an aggregate user rating for the set of user identifiers may be determined, which may be used for the station score. The delivery station scores may be used to rank the delivery stations against each other, and the rankings can be presented at a display, as shown in FIG. 7.

One or more operations of the method, process flows, or use cases of FIGS. 1-7 may have been described above as being performed by a user device, or more specifically, by one or more program module(s), applications, or the like executing on a device. It should be appreciated, however, that any of the operations of methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
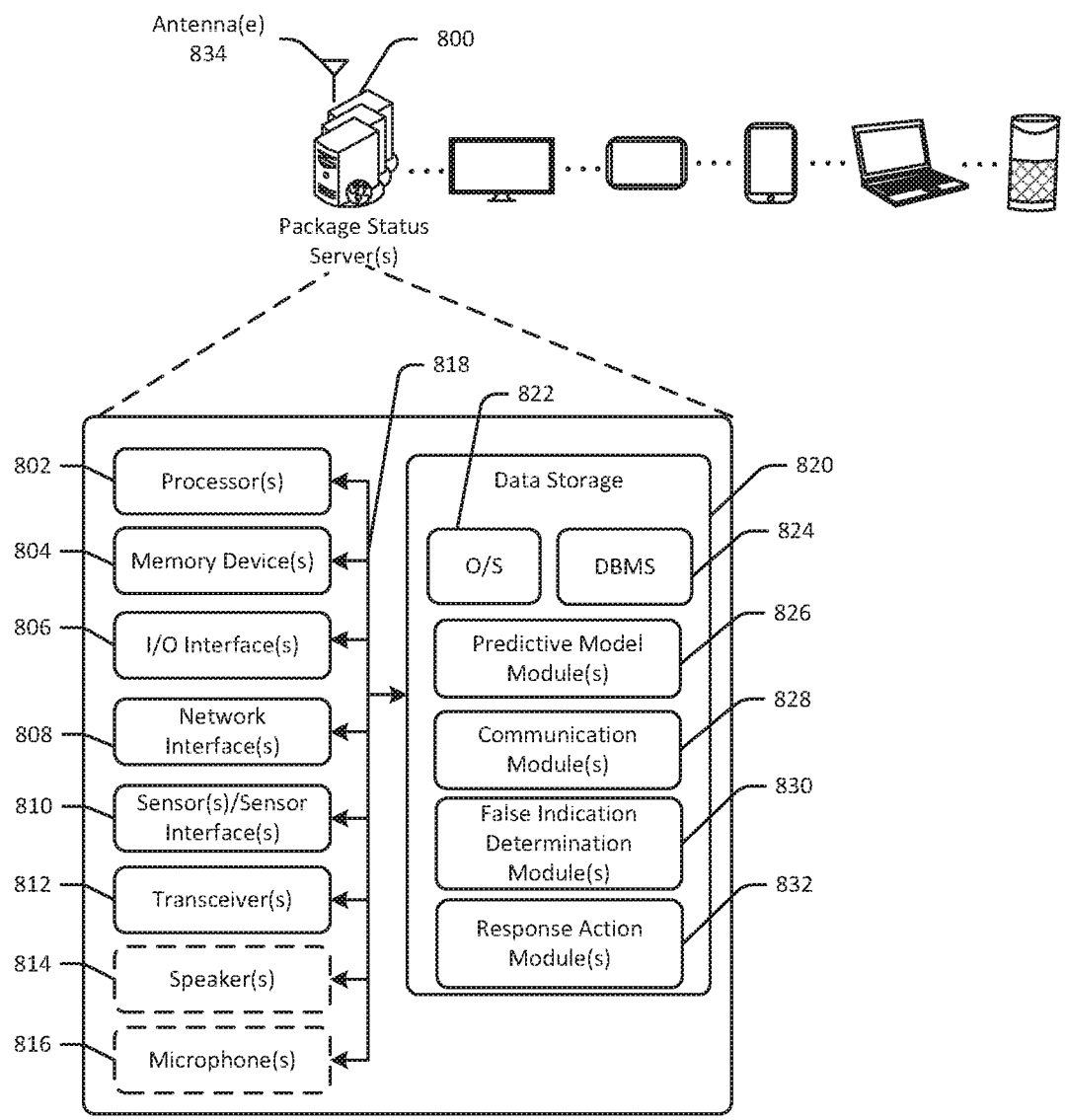
FIG. 8 schematically illustrates an example architecture of a content selection server in accordance with one or more embodiments of the disclosure.

FIG. 8 is a schematic block diagram of one or more illustrative package status server(s) 800 in accordance with one or more example embodiments of the disclosure. The package status server(s) 800 may include any suitable computing device including, but not limited to, a server system, a mobile device such as a smartphone, tablet, e-reader, wearable device, or the like; a desktop computer; a laptop computer; a content streaming device; a set-top box; or the like. The package status server(s) 800 may correspond to an illustrative device configuration for the content selection servers or content delivery servers of FIGS. 1-7.

The package status server(s) 800 may be configured to communicate via one or more networks with one or more servers, user devices, or the like. The package status server(s) 800 may be configured to determine a delivery status of one or more packages using package identifiers, determine probability scores of package status inputs by delivery agents or users, determine a likelihood a package status is false or inaccurate, and other operations. The package status server(s) 800 may be configured to trigger one or more response actions if a probability score for a package status satisfies one or more thresholds. In some embodiments, a single remote server or single group of remote servers may be configured to perform more than one type of functionality.

The package status server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the package status server(s) 800 may include one or more processors (processor(s)) 802, one or more memory devices 804 (generically referred to herein as memory 804), one or more input/output ("I/O") interfaces 806, one or more network interfaces 808, one or more sensors or sensor interfaces 810, one or more transceivers 812, one or more optional speakers 814, one or more optional microphones 816, and data storage 820. The package status server(s) 800 may further include one or more buses 818 that functionally couple various components of the package status server(s) 800. The package status server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the package status server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the package status server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more predictive model module(s) 826, one or more communication module(s) 828, one or more false indication determination module(s) 830, and/or one or more response action module(s) 832. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the package status server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, an example datastore(s) may include, for example, historical data for campaigns, inventory data, campaign performance data, and/or other information.

The processor(s) 802 may be configured to access the memory 804 and execute computer-executable instructions loaded therein. For example, the processor(s) 802 may be configured to execute computer-executable instructions of the various program module(s), applications, engines, or the like of the package status server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the predictive model module(s) 826 may include computer-executable instructions, code, or the like that responsive to execution by one or more of the processor(s) 802 may perform functions including, but not limited to, generating one or more predictive models, ingesting historical data and using the historical data to update and/or train one or more machine learning algorithms, determining probability scores for package status scans or indications, determining delivery agent performance scores, determining station performance scores, and the like.

The communication module(s) 828 may include computer-executable instructions, code, or the like that responsive to execution by one or more of the processor(s) 802 may perform functions including, but not limited to, communicating with remote servers, communicating with remote datastores, sending or receiving notifications, communicating with cache memory data, and the like.

The false indication determination module(s) 830 may include computer-executable instructions, code, or the like that responsive to execution by one or more of the processor(s) 802 may perform functions including, but not limited to, determining a probability that a delivery status for a package is false or inaccurate, applying one or more predictive models or algorithms, correlating historical delivery agent data with station data, comparing values to thresholds, determining thresholds, and the like.

The response action module(s) 832 may include computer-executable instructions, code, or the like that responsive to execution by one or more of the processor(s) 802 may perform functions including, but not limited to, triggering response actions, causing actions to be performed by a user device, causing display of certain data, initiating communications and/or notifications, and the like.

Referring now to other illustrative components depicted as being stored in the data storage 820, the O/S 822 may be loaded from the data storage 820 into the memory 804 and may provide an interface between other application software executing on the package status server(s) 800 and hardware resources of the package status server(s) 800. More specifically, the O/S 822 may include a set of computer-executable instructions for managing hardware resources of the package status server(s) 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the package status server(s) 800 is a mobile device, the DBMS 824 may be any suitable light-weight DBMS optimized for performance on a mobile device.

Referring now to other illustrative components of the package status server(s) 800, the input/output (I/O) interface(s) 806 may facilitate the receipt of input information by the package status server(s) 800 from one or more I/O devices as well as the output of information from the package status server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the package status server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The package status server(s) 800 may further include one or more network interface(s) 808 via which the package status server(s) 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna(e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the package status server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the package status server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 814 may be any device configured to generate audible sound. The microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the package status server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the package status server(s) 800 may include alternate and/or additional hardware, software, or firmware components beyond those described or depicted without departing from the scope of the disclosure. More particularly, it should be appreciated that software, firmware, or hardware components depicted as forming part of the package status server(s) 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. One or more non-transitory computer-readable media storing computer-executable instructions that in response to execution cause operations to be performed, the operations comprising:
   receiving, from a handheld package scanning device, an indication that a delivery agent selected a customer unavailable option in response to a delivery status prompt for a package, wherein the customer unavailable option indicates that a recipient of the package was not available at a delivery address for the package;
   determining a distance between the delivery address for the package and a location of the handheld package scanning device based at least in part on data received from the handheld package scanning device;
   determining a time of day at which the indication was received based at least in part on the data received from the handheld package scanning device;
   determining a probability score indicative of a likelihood that the indication is an inaccurate representation of the delivery status for the package using the distance and the time of day;
   determining that the probability score satisfies an inaccurate status threshold;
   replacing, based at least in part on determining that the probability score satisfies the inaccurate status threshold, a customer unavailable notification for sending to a recipient user account for the recipient of the package with a shipment delayed notification;
   determining a station identifier associated with a delivery agent identifier for the delivery agent; and
   sending, after determining the station identifier, an inaccurate status notification to a station identifier account, wherein the inaccurate status notification comprises a package identifier for the package and the delivery agent identifier.

2. The one or more non-transitory computer-readable media of claim 1, wherein determining the probability score indicative of the likelihood that the indication is an inaccurate representation of the delivery status for the package using the distance and the time of day comprises determining, using one or more predictive models, the probability score indicative of the likelihood that the indication is an inaccurate representation of a delivery status for the package using the distance and the time of day, the operations further comprising:
   determining historical delivery performance data for the delivery agent using the delivery agent identifier;
   generating, using the one or more predictive models, a delivery agent score for the delivery agent; and
   determining a station performance metric for the station identifier using the delivery agent score.

3. The one or more non-transitory computer-readable media of claim 1, the operations further comprising:
   determining a number of inaccurate statuses associated with the delivery agent identifier for a time period;
   determining that the number is greater than an allotted number of inaccurate statuses for the time period; and
   preventing selection of the customer unavailable option at the handheld package scanning device.

4. The one or more non-transitory computer-readable media of claim 1, the operations further comprising:
   determining a station performance metric for the station identifier using respective delivery agent scores for delivery agents associated with the station identifier;
   generating a ranking for the station identifier with respect to other station identifiers, wherein the ranking is based at least in part on the station performance metric; and
   causing presentation of the ranking at one or more display devices.

5. A method comprising:
   receiving, by one or more computer processors coupled to at least one memory and from a user device, an indication that a package for a recipient was not delivered to a delivery address;
   determining a user identifier for a user of the user device;
   determining a location of the user device;
   generating, using the user identifier and the location, a probability score representative of a likelihood the indication is a false indication;
   determining that the probability score satisfies a false indication threshold; and
   initiating, by the one or more computer processors, a response action based at least in part on the determination that the probability score satisfies the false indication threshold, wherein initiating the response action comprises preventing a customer unavailable option from being selected at the user device.

6. The method of claim 5, wherein initiating the response action comprises preventing a message from being sent to a user account of the recipient.

7. The method of claim 6, further comprising sending a shipment delayed message to the user account.

8. The method of claim 5, further comprising:
   determining a distance between the location and the delivery address;

wherein determining, using the user identifier and the location, that the likelihood the indication is a false indication satisfies the false indication threshold comprises determining, using the user identifier, the location, and the distance, that the likelihood the indication is a false indication satisfies the false indication threshold.

9. The method of claim 5, further comprising:
determining, using the user identifier, a historical false indication rate for the user;
wherein determining, using the user identifier and the location, that the likelihood the indication is a false indication satisfies the false indication threshold comprises determining, using the user identifier, the location, and the historical false indication rate, that the likelihood the indication is a false indication satisfies the false indication threshold.

10. The method of claim 5, wherein the location is a device location at a first time the indication is received, the method further comprising:
determining a previous location of the user device at a second time a previous indication was received from the user device; and
determining a distance between the device location and the previous location;
wherein determining, using the user identifier and the location, that the likelihood the indication is a false indication satisfies the false indication threshold comprises determining, using the user identifier, the location, and the distance, that the likelihood the indication is a false indication satisfies the false indication threshold.

11. The method of claim 5, further comprising:
determining that a total number of false indications from the user identifier is greater than an allotted number of false indications in a time period; and
triggering a discipline notification.

12. The method of claim 5, further comprising:
determining a time of day at which the indication was received;
wherein determining, using the user identifier and the location, that the likelihood the indication is a false indication satisfies the false indication threshold comprises determining, using the user identifier, the location, and the time of day, that the likelihood the indication is a false indication satisfies the false indication threshold.

13. The method of claim 5, further comprising:
determining a delivery station identifier using the user identifier; and
determining historical performance data of the delivery station identifier;
wherein determining, using the user identifier and the location, that the likelihood the indication is a false indication satisfies the false indication threshold comprises determining, using the user identifier, the location, and the historical performance data, that the likelihood the indication is a false indication satisfies the false indication threshold.

14. The method of claim 5, wherein the indication indicates that a customer was unavailable at the delivery address.

15. The method of claim 5, further comprising:
comparing the probability score to the false indication threshold.

16. The method of claim 5, further comprising:
determining a delivery station identifier using the user identifier;
determining a set of user identifiers associated with the delivery station identifier, the set of user identifiers comprising the user identifier;
determining an aggregate user rating for the set of user identifiers;
ranking the delivery station identifier using the aggregate user rating; and
causing presentation of the aggregate user rating at a display using the ranking.

17. A device comprising:
at least one memory that stores computer-executable instructions;
at least one processor configured to access the at least one memory and execute the computer-executable instructions to:
receive, from a user device, an indication that a package for a recipient was not delivered to a delivery address;
determine a user identifier for a user of the user device;
determine a location of the user device;
generate, using the user identifier and the location, a probability score representative of a likelihood the indication is a false indication;
determine that the probability score satisfies a false indication threshold; and
initiate a response action based at least in part on the determination that the probability score satisfies the false indication threshold, wherein initiating the response action comprises preventing a customer unavailable option from being selected at the user device.

18. The device of claim 17, wherein the at least one processor is further configured to access the at least one memory and execute the computer-executable instructions to:
determine a distance between the location and the delivery address;
determine, using the user identifier, a historical false indication rate for the user; and
determine a time of day at which the indication was received;
wherein the at least one processor is configured to determine that the likelihood the indication is a false indication satisfies the false indication threshold by executing the computer-executable instructions to determine that the likelihood the indication is a false indication satisfies the false indication threshold using the user identifier, the location, the distance, the historical false indication rate, and the time of day.

19. The device of claim 17, wherein the at least one processor is configured to initiate the response action by executing the computer-executable instructions to:
prevent a message from being sent to a user account of the recipient; and
sending a shipment delayed message to the user account.

* * * * *